Feb. 17, 1953     M. M. GOLDBERG     2,628,778
TENS CARRY MECHANISM FOR ACCOUNTING MACHINES
Original Filed Nov. 2, 1946     8 Sheets-Sheet 1

INVENTOR
MAXIMILIAN M. GOLDBERG
BY
HIS ATTORNEYS

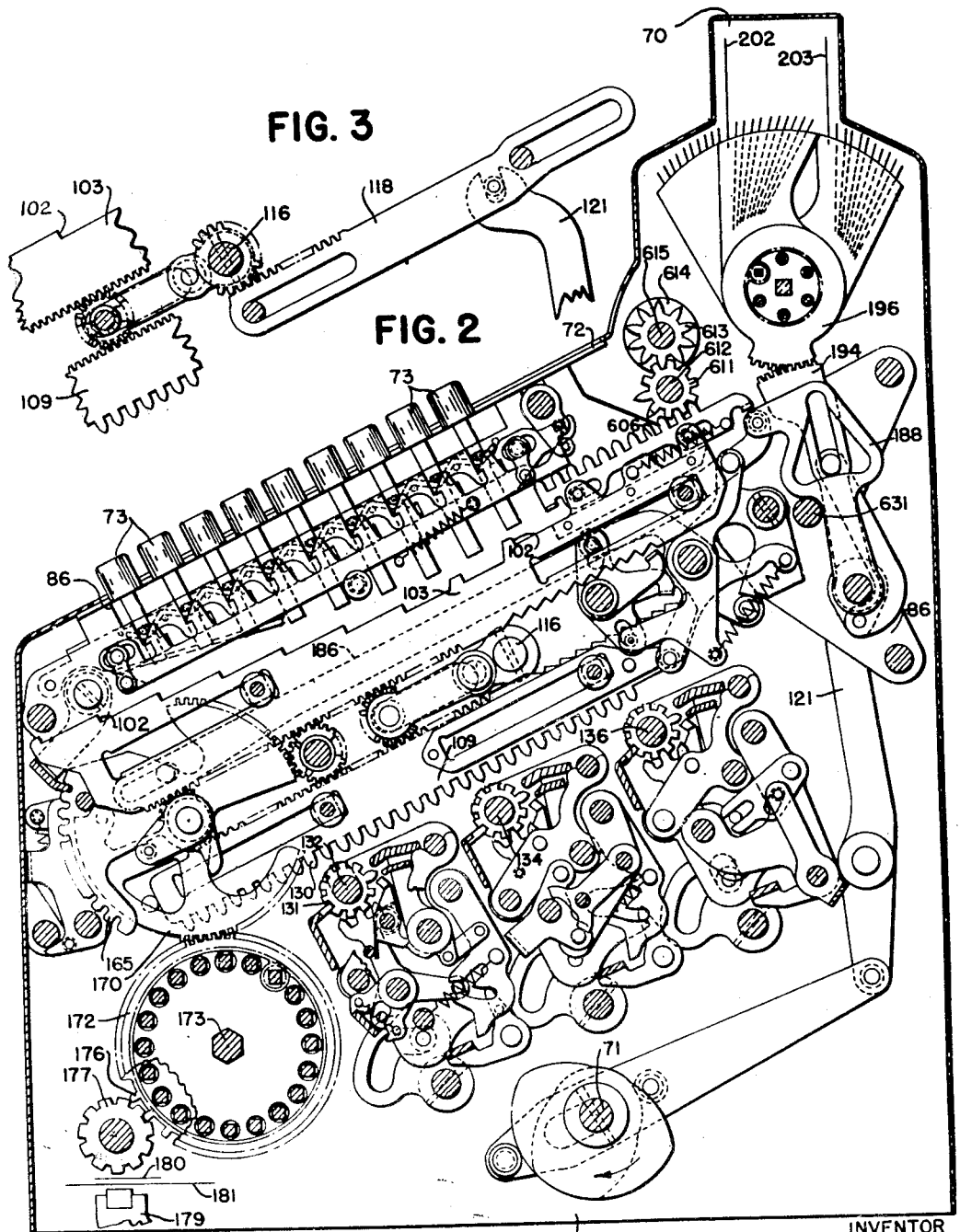

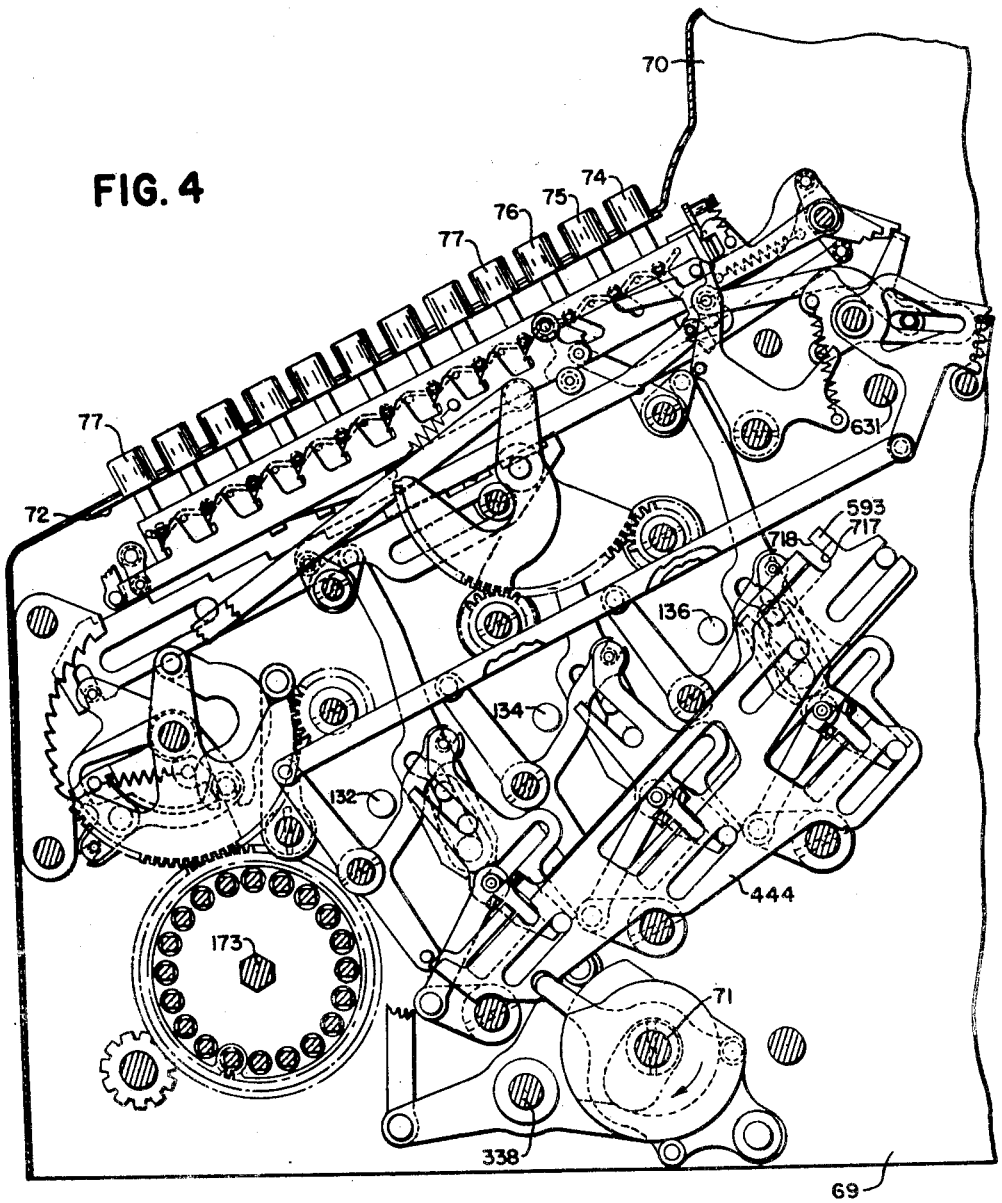

Feb. 17, 1953     M. M. GOLDBERG     2,628,778
TENS CARRY MECHANISM FOR ACCOUNTING MACHINES
Original Filed Nov. 2, 1946     8 Sheets-Sheet 4
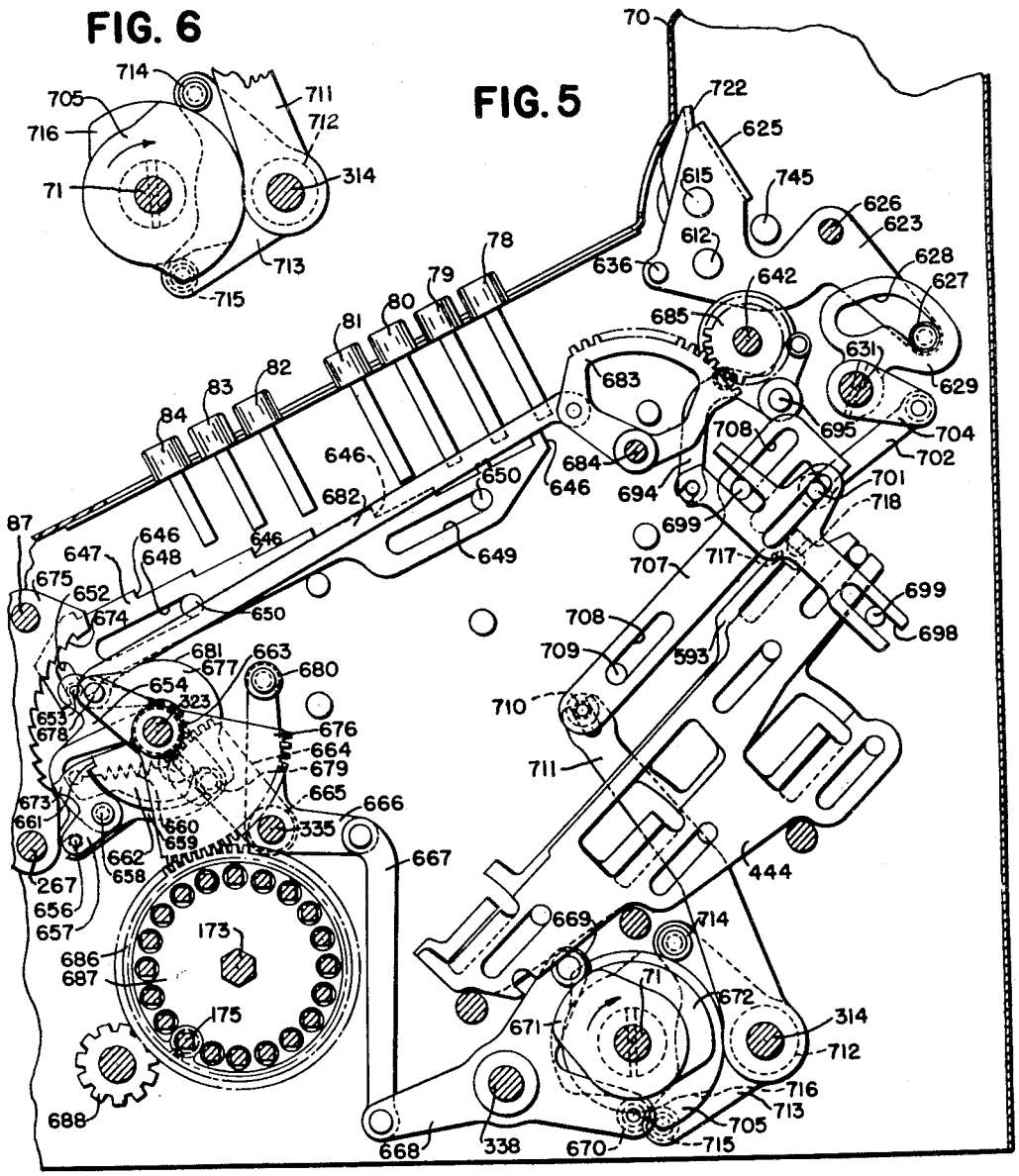
INVENTOR
MAXIMILIAN M. GOLDBERG
HIS ATTORNEYS Feb. 17, 1953 M. M. GOLDBERG 2,628,778
TENS CARRY MECHANISM FOR ACCOUNTING MACHINES
Original Filed Nov. 2, 1946 8 Sheets-Sheet 5
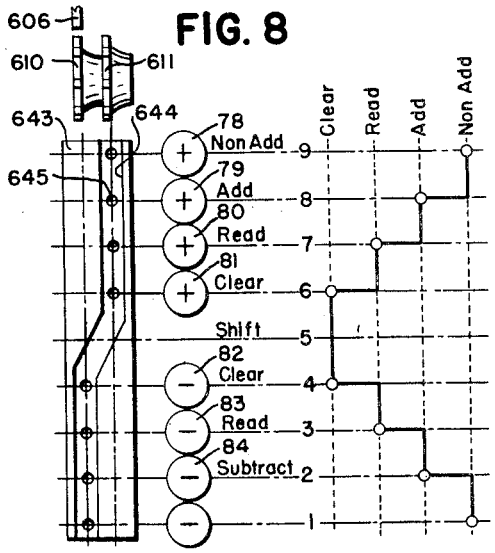
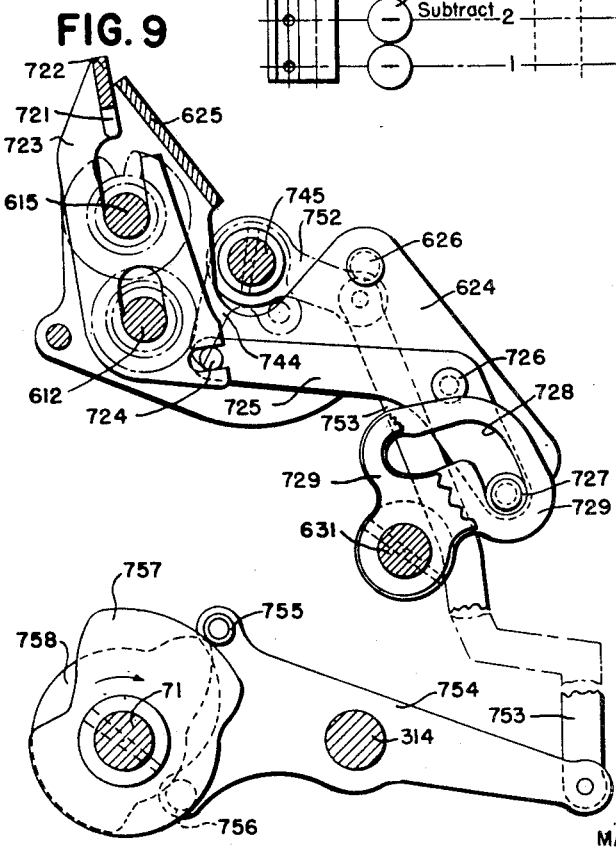
INVENTOR
MAXIMILIAN M. GOLDBERG
HIS ATTORNEYS

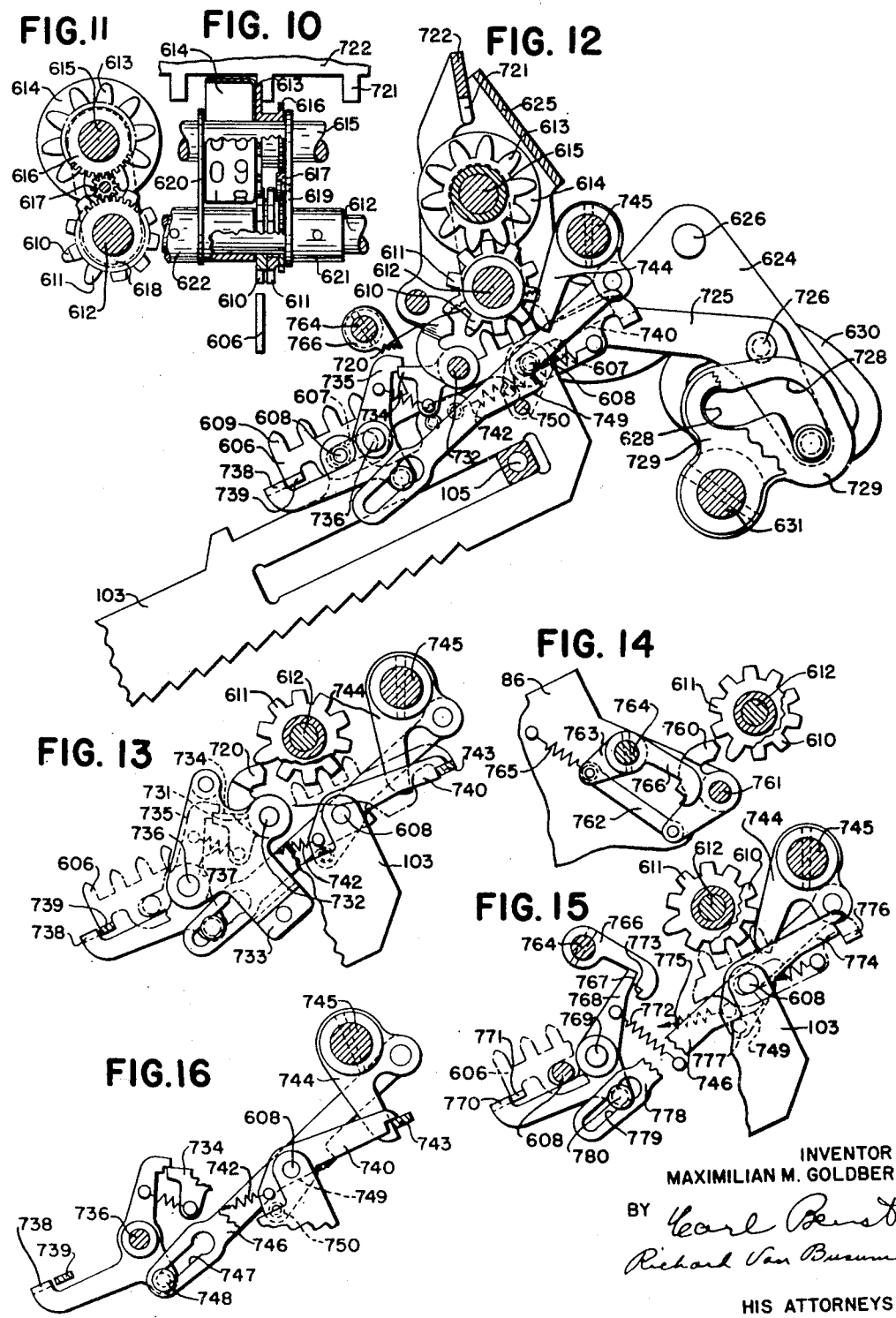

Feb. 17, 1953 M. M. GOLDBERG 2,628,778
TENS CARRY MECHANISM FOR ACCOUNTING MACHINES
Original Filed Nov. 2, 1946 8 Sheets-Sheet 7

INVENTOR
MAXIMILIAN M. GOLDBERG
BY
HIS ATTORNEYS

INVENTOR
MAXIMILIAN M. GOLDBERG
BY
HIS ATTORNEYS

Patented Feb. 17, 1953

2,628,778

UNITED STATES PATENT OFFICE 2,628,778

TENS CARRY MECHANISM FOR ACCOUNTING MACHINES

Maximilian M. Goldberg, Dayton, Ohio, assignor to The National Cash Register Company, Dayton, Ohio, a corporation of Maryland Original application November 2, 1946, Serial No. 707,360, now Patent No. 2,584,864, dated February 5, 1952. Divided and this application May 5, 1951, Serial No. 224,719

5 Claims. (Cl. 235—133)

The present invention relates to cash registers and accounting or bookkeeping machines and is particularly directed to the tens transfer mechanisms of such machines.

This application is a division of the application for United States Letters Patent Serial No. 707,360, filed November 2, 1946, now Patent No. 2,584,864, by Maximilian M. Goldberg.

The main object of the present invention is the provision of an accounting machine having various unique features which make it easily adaptable to various business systems, the arrangement and the construction of the parts of said machine making for the economical manufacture and assembly thereof and providing convenient and ready accessibility of the various units of the machine for the purpose of adjustment and/or repair in case these are desirable or necessary.

Another object of the present invention is to provide a balance totalizer with a novel tens transfer mechanism.

With these and incidental objects in view, the invention includes certain novel features of construction and combinations of parts, a preferred form or embodiment of which is hereinafter described with reference to the drawings which accompany and form a part of this specification.

In said drawings:

Fig. 2 is a cross-sectional view of the machine taken just to the right of one of the amount banks.

Fig. 3 is a detail view of the differential driving mechanism for one of the amount banks.

Fig. 4 is a right side elevation of the control bank and associated mechanism for one of the lines of transaction totalizers.

Fig. 5 is a right side elevation of the control keys and associated differential mechanism for the auxiliary or balance totalizer.

Fig. 6 is a detail view of the cam and associated mechanism for engaging and disengaging the auxiliary totalizer in adding operations.

Fig. 7 is a detail view of the cam and associated mechanism for driving the differential mechanism for the control bank shown in Fig. 5.

Fig. 8 is a diagrammatic view of the cam and associated mechanism for shifting the auxiliary totalizer laterally to aline the selected plus or minus wheels with the actuators.

Fig. 9 is a detail view of the aliner mechanism and the transfer restoring mechanism for the auxiliary totalizer.

Figs. 10 and 11 are, respectively, front and right side views of the plus and minus totalizer wheels and corresponding indicator wheel for one denominational order of the auxiliary totalizer.

Fig. 12 is a cross-sectional view of the auxiliary totalizer, showing in particular the operating connection between one denominational order and the corresponding primary differential member.

Fig. 13 is a detail view showing in particular the transfer mechanism for one order of the auxiliary totalizer.

Fig. 14 is a detail view showing the highest order totalizer wheels of the auxiliary totalizer and the "fugitive 1" mechanism associated therewith.

Fig. 15 is a detail view showing the lowest order wheels of the auxiliary totalizer and the "fugitive 1" mechanism associated therewith.

Fig. 16 is a detail view showing the transfer mechanism of one denominational order of the auxiliary totalizer in fully-restored position, which is effected near the beginning of machine operations.

DESCRIPTION

*Machine framework, cabinet, and operating mechanism*

Figure 1:
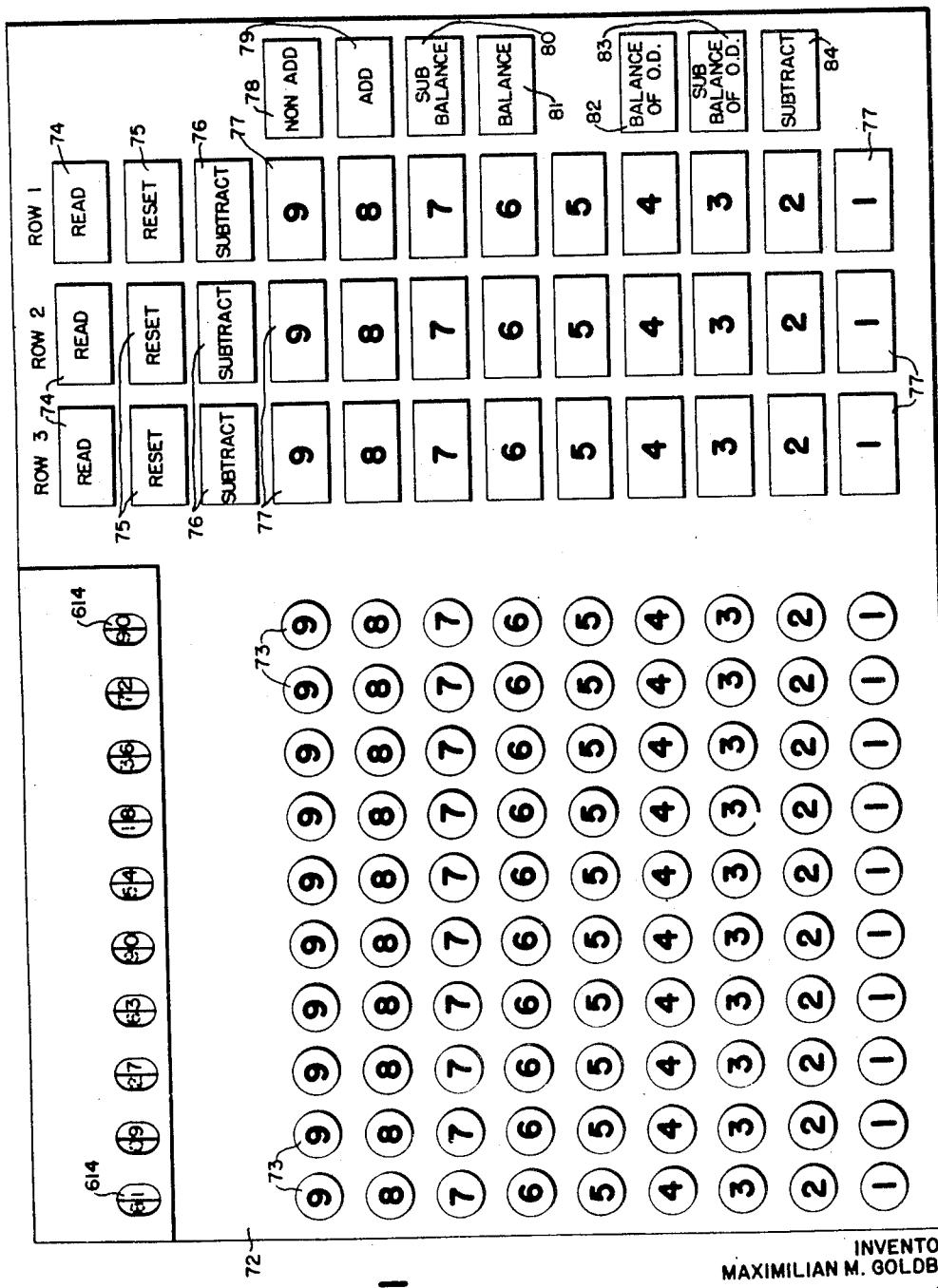
Fig. 1 is a diagrammatic plan view of the keyboard of the machine of the present invention.

The main framework of the machine embodying the present invention comprises a main right frame (not shown), a similar left frame 69 (Fig. 2), and various intermediate frames, said frames being secured to a machine base (not shown) in fixed relationship to each other and further secured in fixed relationship by various cross frames, tie bars, rods, and shafts. The mechanism of the machine is enclosed in a suitable case or cabinet 70 (Fig. 2), which is also secured to the machine base, said cabinet having suitable openings or apertures in its upper portion for displaying the front and back indicators, and a suitable opening just above its keyboard portion for displaying the numerals on the indicator wheels for the balance totalizer.

The machine may be operated by any suitable type of small electric motor or by means of a hand crank, which may be connected by a suitable gearing and a suitable clutch mechanism to a main cam shaft 71 (Figs. 2, 4, and 5), journaled in the main frames, for driving said shaft one clockwise revolution, which is required for each machine operation, including adding, substracting, reading, and resetting operations. Machine operation may be initiated by any suitable type of starting bar or motor key, or by the control keys for the balance totalizer, which may be motorized; or, if desired, by certain of the control keys for the transaction totalizers, which may also be motorized if desired.

In the present application, the machine-operating motor and the mechanism associated therewith for driving the main cam shaft 71 have not been shown; neither has any manual mechanism been shown for operating the machine, as any desired type of starting or operating mechanism which is suitable may be used with satisfactory results, and, as such mechanism constitutes no part of the present invention, it is believed unnecessary to describe and illustrate it further.

Keyboard mechanism

The keyboard mechanism of the present machine is of unit construction and comprises a main keyboard plate 72 (Figs. 1 and 2), which is secured to the machine framework and which supports eight denominational rows of numeral or amount keys 73, each row comprising keys numbered from 1 to 9, as is the usual practice in machines of this character. The keyboard likewise comprises three rows of transaction keys for the three transaction totalizers, each of said rows of transaction keys including a Read key, a Reset key 75, a Subtract key 76, and nine totalizer selecting keys 77 for selecting the nine sets of interspersed totalizer wheels on the corresponding line. The keyboard likewise includes a row of control keys for the auxiliary or balance totalizer located just to the right of the transaction keys, said control keys including a Non-Add key 78, an Add key 79, a Sub-Balance key 80, and a Balance key 81, for controlling the plus side of said balance totalizer, and including a Balance of Overdraft key 82, a Sub-Balance of Overdraft key 83, and a Subtract key 84, for controlling the minus side of said balance totalizer. In addition to their other functions, the control keys 78 to 84 also initiate operation of the machine.

Inasmuch as the present disclosure is concerned chiefly with the tens transfer mechanism for the balance totalizer, other mechanism which is included only for the purpose of providing a background for said tens transfer mechanism will be but briefly described hereinafter.

The machine embodying the present invention is provided with a flat keyboard 72 (Figs. 1 and 2), which is conceded by many to be the most efficient type of keyboard for use in connection with accounting machines, and this keyboard comprises a plurality of denominational rows of amount keys 73 for setting up values to be entered in the totalizers of the machine. Each amount bank is provided with a unique form of differential mechanism comprising a primary member 103, which is positioned directly by the depressed amount keys in the corresponding order, and a secondary differential member 109, connected to the primary member for complementary movement in relation thereto, said secondary member having on its lower edge teeth 130, which are engageable by the selected set of wheels 131 on any one or all of the three transaction totalizer lines 132, 134, and 136 for actuation by said secondary member. The primary and secondary differential members are mounted for parallel shifting movement in relation to each other, and said members are driven by a constant displacement device 116, 118, and 121, which makes one complete excursion of movement each machine operation, including adding, subtracting, total recording, and sub-total recording operations. The unique construction of the differential mechanism eliminates the necessity for a zero stop mechanism in connection with the amount banks, which mechanism is usually a necessary part of accounting machines to stop the differential mechanisms in zero position when no key is depressed in the corresponding amount bank.

The primary differential members have thereon graduated steps 102, which cooperate directly with the lower ends of the stems of the corresponding amount keys 73, and said primary differential members 103 are directly positioned by the depressed amount keys to the complement of the values represented by said amount keys and in turn cause the corresponding secondary differential members 109 to be positioned to the true values of said depressed amount keys. As a matter of convenience, the complement of 9 is used in setting the primary and secondary differential members in relation to each other. As an example of operation, when the 9 amount key is depressed in a particular order, the corresponding primary differential member 103 is retained in zero or home position against any movement, and, as a result, the secondary differential member 109 moves full distance to its ninth position. Likewise, when no amount key is depressed, the primary differential member is free to move full distance to ninth position, and, as a result, no movement is imparted to the secondary differential member, which remains in zero position. It is therefore quite obvious that this arrangement of the differential members obviates the necessity for a zero stop mechanism in the amount banks.

When the 5 amount key is depressed, the primary differential member 103 moves four steps and the secondary member 109 moves five steps. In other words, the total movement of the primary and secondary members is nine steps, and, as explained above, this movement may be confined to either of the members or divided between them to transmit the values set up on the amount keys to the totalizers, the recording mechanism, and the indicating mechanism.

As stated before, the present machine is provided with three lines 132, 134, and 136 of transaction totalizers, each line having thereon nine sets of interspersed totalizer wheels 131, which are actuated by the teeth 130 on the lower edges of the corresponding secondary differential members 109, and likewise said machine comprises a balance or auxiliary totalizer 612, often referred to as a crossfooter, the wheels of which are actuated by auxiliary racks connected to the corresponding primary differential members.

There is no desire or need to limit the present machine to three lines of totalizers, as these may be increased by the simple expedient of incorporating additional totalizer units in the machine and by extending the toothed portions of the secondary differential members to actuate the wheels of these additional totalizer units.

Likewise, it is but a matter of assembly to decrease the number of totalizer lines with which the machine is equipped.

There is a row of combined selecting and control keys for each of the transaction totalizer lines, and each row of these keys comprises keys 77 (Figs. 1 and 4), numbered 1 to 9, for selecting the nine sets of totalizers on the corresponding line. In addition, each row of control keys contains a Read key 74, a Reset key 75, and a Subtract key 76 for selecting and conditioning the corresponding totalizer line for the corresponding operations.

It is to be understood that throughout the present specification the term "Read" will be used interchangeably with the terms "sub-total" and/or "sub-totalize," and the term "Reset" will be used interchangeably with the terms "total taking," "totalizing," and/or "clearing."

Depression of a selecting key 77 in one of the transaction banks and not depressing any of the three control keys 74, 75, or 76 in said banks automatically selects and conditions the corresponding totalizer line for an adding operation, and, when no key is depressed in a transaction bank, the corresponding totalizer line is automatically non-added.

From the foregoing explanation, it is obvious that the three transaction totalizers are of the adding and subtracting type and are in many respects similar to those of a well-known type of accounting machine.

In adding operations, the wheels 131 of the selected totalizer or totalizers are engaged with the teeth of the secondary differential members 109 after they have completed their initial movement and prior to their return movement, which return movement rotates said selected wheels in an additive direction to enter therein the value of the depressed amount keys. In subtracting operations, the wheels 131 of the selected totalizer or totalizers are engaged with the teeth of the secondary differential members prior to their initial movement, which initial movement reversely rotates said wheels to subtract therefrom the value of the depressed amount keys.

In reading and resetting operations, the wheels of the selected totalizer are engaged with the secondary differential members prior to their initial movements, which movements reversely rotate said wheels to zero position, which is determined by the long teeth on said wheels contacting a zero stop bar, which is normally ineffective but which is moved to effective position in reading and resetting operations.

In resetting operations, the wheels of the selected totalizer are disengaged from the secondary differential members after said members complete their initial movements, to zeroize said wheels, and consequently said wheels remain in a zeroized condition.

In reading operations, the wheels of the selected totalizer remain in engagement with the secondary differential members during their return movements, which movements restore said wheels to their original positions.

As previously explained, in adding and subtracting operations the primary differential members 103 are positioned to the complement of the true values of the depressed amount keys 73, and the secondary differential members 109 are positioned to the true values of said amount keys. This positioning of the secondary differential members, in addition to actuating the totalizer wheels, also positions the corresponding printing wheels 177 (Fig. 2) and the corresponding front and back indicator targets 202 and 203 to cause the true values of said depressed amount keys to be recorded and indicated.

The primary differential members have, on their lower edges, teeth which engage corresponding pinions, and the secondary differential members have, on their upper edges, teeth which engage corresponding pinions, said pinions being mounted on a common axis. Each of the primary and secondary pinions has thereon a driving lug which cooperates, respectively, with a corresponding lug on a pinion mounted on the same axis as the primary and secondary pinions. The latter pinion meshes with a toothed portion of a corresponding differential segment 165 (Fig. 2), which is connected by a latch mechanism to a corresponding printer-positioning sector 170, which latter, through the well-known Kreider type of internal-external gear-driving mechanism 172, positions the corresponding type wheels 177 in accordance with the values of the depressed amount keys 73, in adding and subtracting operations. After the type wheels 177 have been positioned, a printing hammer 179 functions to carry suitable record material 181 and an inking ribbon 180 into contact with said type wheels to print the amount corresponding to the value of the depressed amount keys on said record material. Likewise, the printing sectors 170 have gear teeth which engage rack teeth on corresponding pitmans 186, which, through connecting trains of mechanisms 188, 194, and 196, position the corresponding front and back indicator targets 202 and 203 in accordance with the values of the depressed amount keys in adding and subtracting operations.

At the beginning of each adding and subtracting operation, the corresponding segments and sectors are restored from the positions to which they were set in the preceding operation to normal or zero position. After the segments and the sectors have been restored to normal position, initial movement of the primary differential members revolves the corresponding primary pinions in unison therewith, to move the lugs carried thereby away from the corresponding lugs on the segment pinions and to positions corresponding to the complements of the depressed amount keys. After the primary differential members and their pinions have thus been positioned, initial movement of the secondary differential members and their corresponding pinions causes the lugs on said pinions, in cooperation with the corresponding lugs on the segment pinions, to carry said lugs and said pinions in unison therewith until said parts and the corresponding differential segments 165 and printer segments 170 are positioned in accordance with the values of the depressed amount keys 73. When the secondary differential members are finally positioned in accordance with the positions of the corresponding primary differential members, the lugs carried by the corresponding differential segment pinion are imprisoned, respectively, between the corresponding lugs on the secondary pinions and the corresponding lugs on the primary pinions, and thus a positive positioning of the corresponding printing wheels and indicators is obtained and maintained. In adding and subtracting operations, initial movement of the secondary differential members, after the primary members have been positioned, causes corresponding retaining pawls to engage corresponding notches on the lower edges of the primary members to retain said members in set positions during positioning of the secondary members.

The present machine is provided with a unique mechanism for eliminating the recording and indication of zeros in the higher denominations.

Instead of the usual practice of incorporating the zero-eliminating mechanism in the printer mechanism, the zero elimination mechanism of the present machine is incorporated in the differential mechanisms, and, as a result, not only the zeros of the corresponding printer wheels are eliminated, but also the zeros of the corresponding indicators are likewise eliminated, thus simplifying and facilitating the reading of both the printed record and the indication.

As previously explained, a latch mechanism conneats the corresponding differential segments and printer sectors for unitary movement under normal conditions. However, when no key is depressed in an amount bank, a spring-urged zero elimination pawl moves inwardly over a shoulder on the latch for this bank, and subsequent rotary movement of said pawl disengages said latch from the corresponding differential segment and moves said latch and the corresponding printer sector to which said latch is connected, in a reverse direction one step beyond zero to a blank position. This causes said sector in turn to move the corresponding printing wheels and the corresponding indicators also one step beyond zero position to a blank position, so that the zeros of the higher orders will not be indicated or printed.

When the differential segments and the corresponding printer sectors are moved away from zero position, while being positioned under influence of the depressed amount keys, an arcuate surface on each of said printer sectors moves into the path of the corresponding zero elimination pawl to retain said pawls in ineffective positions. Each of the zero elimination pawls carries a stud which overlies a shoulder on the adjacent lower order zero elimination pawl to retain said adjacent lower order pawls in ineffective position, and this action continues through all the lower orders, so that the zeros of the lower orders will be recorded when an amount key is depressed in a higher order.

The unique construction of the differential mechanism of the present machine provides for the inclusion of an efficient repeat mechanism of simple construction which may be rendered effective to repeat the amount of a previous operation without any foreknowledge that such previous amount is to be repeated.

It will be recalled that the differential segments and the corresponding printer sectors remain in set positions at the end of machine operation and are returned to home or zero positions at the beginning of the succeeding machine operation. In the present adaptation, manipulative means is provided for disengaging the liner for the differential segments from its operating means and locking said liner in engaged position to secure the differential segments in their preset positions, said manipulative means also being effective to simultaneously disengage the differential segment and printer sector restoring means from its operating mechanism. As a result, the segments and the sectors remain in the positions in which they were set in the previous operation, and likewise the type wheels and the indicators positioned thereby remain in their preset positions to repeat the amount of the previous operation. Securing of the differential segments in preset positions causes said segments, through the corresponding connecting pinions and the lugs carried thereby, to position the primary and secondary differential members in accordance with the preset positions of said segments, so that the repeated amount may be entered either additively or subtractively, as desired, in any selected totalizer. Obviously an amount may be repeated as many times as desired. Moreover, the amounts of previous reading and/or resetting operations may be repeated for the purpose of transferring totals, or for other purposes, in the same manner that the amounts of previous adding and subtracting operations are repeated.

In reading and resetting operations, often referred to as sub-total and total recording operations, it is necessary that the wheels 131 (Fig. 2) of the selected totalizer position the secondary differential members, which in turn position the differential segments and the printer sectors. In this case, it is necessary that the secondary differential members 109 receive their movements before the primary members 103, in order that said secondary members may be positioned by the wheels of the selected totalizer. This, it will be recalled, is the reverse of what takes place in subtracting and adding operations, in which the primary members move first to be positioned by the depressed amount keys and afterwards position the secondary differential members in accordance therewith.

In order to free the secondary differential members for initial movement prior to the movement of the primary differential members, it is necessary that the corresponding differential segments 165 and printer sectors 170 be restored in a direction reverse to that in which they are restored in adding and subtracting operations, and this reverse restoring is accomplished automatically through conditions set up by depression of the Read or Reset key for the selected totalizer. This reverse movement of the differential segments moves the projecting lugs on the corresponding segment pinions out of the paths of the corresponding lugs on the secondary pinions and into the path of the lugs on the corresponding primary pinions, so that the secondary differential members are free to move first in reading and resetting operations.

In machines of this type, the usual practice is to use the transfer trip pawls in cooperation with the long teeth on the totalizer wheels to stop said wheels in zero position in reading and resetting operations. However, in the present machine, the same trip pawls are used to trip the transfer mechanism in both adding and subtracting operations, and for this reason a zero stop bar has been provided. Said bar is moved into effective position in reading and resetting operations and during other operations of the machine remains ineffective.

In reading and resetting operations, after the differential segments 165 and the printer sectors 170 have been restored in a reverse direction, and after the zero stop bar has been moved to effective position, the wheels of the selected totalizer are engaged with the secondary differential members 109. Initial movement of the secondary members rotates said selected wheels in a reverse direction until the long teeth thereon contact the zero stop bar to position said wheels at zero position. This positions the secondary differential members in accordance with the amount standing on the totalizer wheels. After the secondary differential members 109 (Fig. 2) have been positioned in the manner explained above, the primary differential members 103 are positioned in accordance therewith and, through their pinions and the lugs thereon, in cooperation with the corresponding lugs on the differential pinions, position the differential segments 165 and the corresponding printer sectors 170 in accordance with the amount standing on the selected totalizer wheels. The printer sectors in turn transmit their positioning to the corresponding printing wheels 177 and the corresponding indicators 202 and 203.

In resetting operations, the wheels of the selected totalizer are disengaged from the corresponding secondary differential members 109 prior to their return movements, and consequently said wheels remain in a zeroized condition. The only difference between reading and resetting operations is that in reading operations the wheels of the selected totalizer remain in engagement with the secondary differential members during their return movements, which movements restore said wheels to their original positions.

In reading and resetting operations, the action of the differential member retaining mechanism is reversed, and initial movement of the primary differential members, after the secondary differential members have been positioned, causes the retaining mechanism to engage corresponding notches in the secondary differential members to retain said members in set positions during positioning of the primary differential members. This, it will be recalled, is the reverse of the action of the retaining mechanism in adding and subtracting operations, in which operations initial movement of the secondary differential members, after the primary members have been positioned, causes the retaining mechanism to retain said primary members in set positions while the secondary members 109 and the corresponding differential segments 165 and printer sectors 170 are being positioned in accordance therewith.

Auxiliary or balance totalizer

In addition to the three lines of interspersed transaction totalizers explained in a general way in the preceding pages, the present machine is provided with an auxiliary or balance totalizer, sometimes referred to as a crossfooter, which is actuated by the primary differential slides 103 (Fig. 2) of the amount differential mechanism. Inasmuch as the primary slides are always positioned to the complement of the amount set up on the amount keys 73 and in turn position the corresponding secondary differential slides 109 to the true value of the amount set up on said amount keys for the proper positioning of the corresponding printing wheels and indicators, it was necessary to arrange the auxiliary totalizer for the accumulation of complementary values.

Each denominational order of the auxiliary totalizer comprises a plus gear wheel and a minus gear wheel, which are actuated by an auxiliary rack shiftably mounted upon the corresponding primary differential slides 103. The minus gear wheel of each denominational order has fixed thereto a gear connected by a small intermediate pinion to a corresponding gear, which is in turn fixed to a corresponding indicator wheel. The indicator wheel has, integral therewith, another gear which meshes directly with the teeth of the corresponding plus wheel.

It is therefore obvious that the plus and minus wheels of each denominational order are geared together for reverse movement; that is, when a plus wheel of one order is engaged with the corresponding actuator, as in adding operations, the minus wheel of the same order is rotated in a reverse direction, and when the minus wheel is engaged with the corresponding actuator, as in subtract operations, the corresponding plus wheel is driven in a reverse or subtractive direction.

The indicator wheel of each denominational order has thereon two sets of numerals; namely, a plus set, corresponding to the plus wheel of the same order, and a minus set of numerals, corresponding to the minus wheel of the same order. In adding operations, the plus wheels are engaged with the auxiliary actuator racks and are driven thereby in an additive direction to the complement of the true amount. However, as the corresponding plus wheels are reversely geared to the minus wheels, said minus wheels are positioned to the true amount, and, as a result, the negative numerals on the corresponding indicator wheels indicate the true amount.

The numerals on the indicator wheels are visible through corresponding openings in the upper portion of the machine cabinet, and said indicator wheels are provided with a shutter mechanism which functions automatically for covering the set of numerals on said wheels which are not to be read and for simultaneously exposing the set of numerals on said wheels which are to be read.

The mechanism for automatically shifting the shutter for the indicator wheels to expose the set of numerals thereon which indicate the true amount constitutes no part of the present invention and therefore has not been shown in detail or described herein, as any suitable type of mechanism may be used for this purpose.

In subtracting operations, the minus wheels are engaged with the auxiliary actuator racks and are driven thereby in an additive direction to rotate the corresponding adding wheels in a reverse direction to subtract therefrom the value of the depressed amount keys. In subtracting operations, as long as the auxiliary totalizer is in a positive condition, the minus numerals on the indicator wheels contain the true amounts and consequently are exposed by the automatic shutter mechanism for reading purposes, the same as in adding operations. If during a subtracting operation the balance or auxiliary totalizer becomes overdrawn, the plus set of wheels in this case contain the true negative balance, and likewise the plus numerals on the corresponding indicator wheels indicate the true negative balance and are consequently exposed by the shutter mechanism for reading in such cases.

In normal sub-balance and balance operations in the auxiliary totalizer—that is, when said totalizer is in a positive condition—the plus wheels of said totalizer are selected for engagement and disengagement with and from the auxiliary actuator racks and are reversely rotated by said racks to zero positions. Inasmuch as said plus wheels contain the complement of the true amount, they likewise position the primary differential slides to the complement, and said primary slides in turn position their corresponding secondary slides 109 to the true amount, said secondary slides in turn positioning the corresponding type wheels and indicators to the true amounts.

In normal balance operations, the plus wheels of the auxiliary totalizer are engaged with the auxiliary actuator racks prior to their initial movement, which movement rotates said wheels to zero positions, which are determined by the long teeth on said wheels contacting the corresponding transfer pawls. After said wheels have been zeroized and prior to forward return movement of the primary differential slides 103 and the auxiliary actuator racks carried thereby, said wheels are disengaged from said actuators so that they will remain in a zeroized condition. The only difference between a balance operation and a sub-balance operation is that in sub-balance operations the plus wheels of the auxiliary totalizer remain in engagement with the corresponding auxiliary actuator racks during their return forward movement, and consequently said wheels are restored to their original positions.

In balance and sub-balance of the overdraft operations, the minus wheels of the auxiliary totalizer are selected for engagement with the auxiliary actuator racks, as said minus wheels contain the complement of the true negative balance, and it is necessary to position the primary differential slides 103 to said complement. Positioning the primary differential slides to the complement of the true negative balance causes said slides in turn to position the corresponding secondary slides 109 and the corresponding type wheels and indicators to the true negative balance, so that said true negative balance will be indicated and recorded.

By referring to Fig. 1, it will be recalled that the functions of the auxiliary totalizer are controlled by the control keys 78 to 84 inclusive on the extreme right-hand side of the keyboard, and that by proper use of these control keys in conjunction with the three rows of transaction control and selecting keys 74 to 77 inclusive for the three lines of transaction totalizers, explained earlier herein, positive and/or negative amounts may be transferred from said auxiliary or balance totalizer to said transaction totalizers, and likewise positive and/or negative amounts may be transferred from said transaction totalizers to said auxiliary totalizer, as will be explained in detail later. It will likewise be recalled that the control keys 78 to 84 inclusive are motorized keys and that depression of any one of these keys, in addition to its other functions, initiates machine operation.

The mechanism of the auxiliary totalizer, explained in general above, will be explained in detail in the ensuing pages.

*Auxiliary totalizer actuator mechanism*

Each primary differential slide 103 (Figs. 2 and 12) has shiftably connected thereto an actuator rack 606, each of said racks being shiftably connected to its corresponding slide 103 by means of parallel slots 607 in said racks, in cooperation with studs 608 secured in upward extensions of said slides 103.

Inasmuch as each denominational order of the auxiliary totalizer has similar mechanism, it is believed that a description of the $10.00 order—that is, the order corresponding to the amount differential mechanism shown in Fig. 2—will be sufficient.

The actuator rack 606 for the denomination being described has, on its upper edge, teeth 609, which are arranged to mesh with teeth in corresponding plus and minus auxiliary totalizer wheels 610 and 611 (Figs. 10, 11, and 12) free on a rod 612. Like the usual type of balance totalizer, the plus and minus wheels 610 and 611 are geared together for reverse movement, so that, when the plus wheel is engaged with the actuator 606, it is driven in an additive direction and through the reverse gearing drives the corresponding minus wheel 611 in a reverse or subtractive direction. Likewise, when the minus wheel 611 is engaged with the actuator 606 in subtract operations, it is driven in an additive direction and through the reverse gearing drives the corresponding plus wheel 610 in a subtractive direction, to obtain the desired result.

The teeth of the plus wheel 610 (Figs. 10, 11, and 12) mesh directly with the teeth of a gear 613 integral with an indicator wheel 614 free on a rod 615. Also integral with the wheel 614 and the gear 613 is a smaller gear 616, which meshes with an idler pinion 617, said pinion in turn meshing with a gear 618 integral with the minus wheel 611. It is obvious that, through the gearing described above, the plus wheel 610 and the minus wheel 611 are geared together for reverse rotation, so that, when one turns in a clockwise direction, the other turns in a counter-clockwise direction, and vice versa. The pinion 617 is pivotally mounted on a plate 619, having two holes which engage, respectively, the rods 612 and 615, and said plate, together with a companion plate 620, which is likewise supported by the rods 612 and 615, in cooperation with collars 621 and 622, retains the totalizer wheels 610 and 611 and the corresponding indicator wheel 614 for each denominational order in their proper lateral positions upon said rods 612 and 615.

The rods 612 and 615 (Figs. 5, 12, 17, and 21) are mounted for axial shifting movement between right and left arms 623 and 624 connected by a bail to form a rockable framework 625, said right and left arms being rockably supported on their respective studs 626 secured in axial alinement in the right and left machine frames. The similar arms 623 and 624 (Figs. 5 and 17) carry, respectively, rollers 627, which cooperate, respectively, with identical cam slots 628 in cams 629 and 630 secured on a shaft 631 journaled in the machine framework.

The manner in which the cams 629 and 630 are operated to in turn rock the totalizer framework 625 back and forth to engage and disengage the totalizer wheels with and from the auxiliary actuator racks 606 will be explained in detail later.

Figure 21:
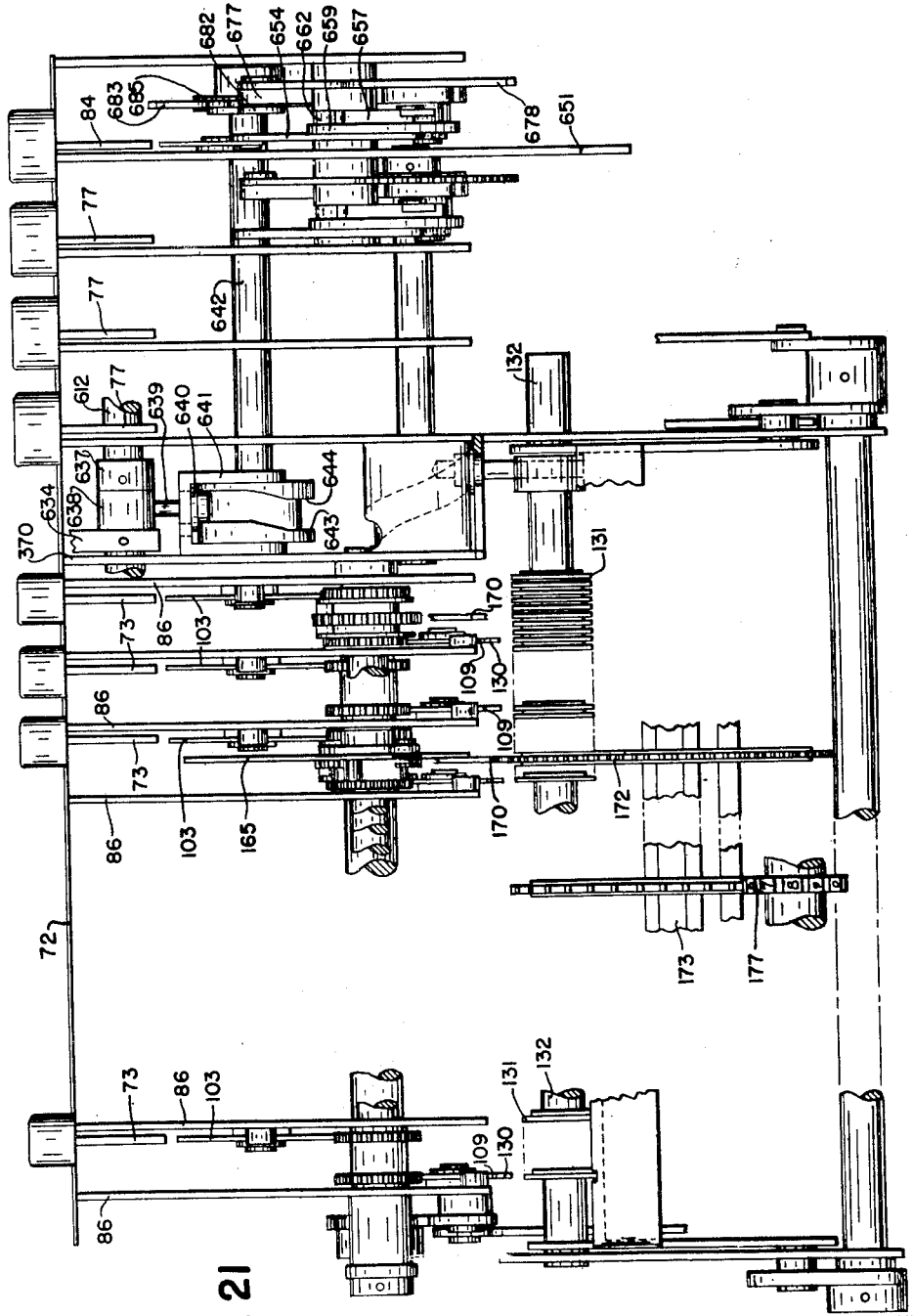
Fig. 21 is a general side-spacing view as observed from the front of the machine.

The rods 612 and 615 (Figs. 17 and 21) are further braced and secured in spaced relationship to each other by similar arms 634 and 635 secured to said rods, said arms having, in forward extensions thereof, holes which slidably engage a rod 636 extending between and secured in the right and left arms 623 and 624. Rotatably supported on the rod 612, between the right-hand arm 634 and a spacing collar 637 secured on said rod, is a collar 638 having secured therein a pin 639, which freely engages a hole in a roller 640, a reduced upper portion of which engages a slot in the cross member of a bracket 641. Opposite arms of the bracket 641 have holes which freely engage a shaft 642 journaled in the machine framework, the left arm of said bracket 641 being secured to the order plate 370 (Fig. 21).

The arms of the bracket 641 straddle and snugly embrace a drum-shaped shifting cam 643 secured on the shaft 642, said cam having a shifting groove 644 engaged by a reduced downward portion of the roller 640. An enlarged flange, formed between the upper and lower reduced portions of the roller 640, fits between the cross member of the bracket 641 and the periphery of the cam 643 to prevent displacement of said roller.

In Fig. 8, which shows a diagrammatic view of the cam 643 and the shifting groove 644, it will be seen that the plus portion of the groove 644, which alines the plus wheels 610 of the auxiliary totalizer with the actuators 606, has four positions corresponding to the four control keys 78 to 81 inclusive (Figs. 1 and 5) and that the minus portion of the shifting groove 644, which alines the minus wheels 611 with the actuators 606, also has four positions, three of which correspond to the control keys 82, 83, and 84, and the other of which is a blank or unused position in the present adaptation of the machine but is available for use if desirable and/or necessary. The shifting groove 644 (Figs. 8 and 17) has, in its bottom, holes 645 corresponding to the various positions of said cam, said holes arranged to be engaged by the lower end of the pin 639 when the selected set of auxiliary totalizer wheels is engaged with the actuators 606 to insure proper alinement of said wheels with said actuators.

*Auxiliary totalizer differential*

The control keys 78 to 84 inclusive for the auxiliary totalizer (Figs. 1 and 5), through a differential mechanism, position the drum cam 643 to select the plus or minus wheels of the auxiliary totalizer in a manner now to be described.

The lower ends of the stems of the keys 78 to 84 inclusive (Fig. 5) cooperate with corresponding stop surfaces 646 formed on a control slide 647 mounted for linear sliding movement by means of parallel slots 648 and 649 therein in cooperation with studs 650 secured in a control bank partition plate 651 (Fig. 21). A slot 652 in the forward end of the slide 647 engages a stud 653 in a forward extension of a differential sector 654 free on the shaft 323, which, as previously explained, drives the transaction differential mechanisms. The sector 654 has a slot which engages a stud 656 in an extension of a latch 657 pivoted on a stud 658 in a latch plate 659 free on the shaft 323.

A spring 660 urges the latch 657 clockwise to normally maintain a tooth thereon in engagement with a recess 661 in a latch-operating segment 662 free on the shaft 323. Integral with the segment 662 is a partial gear 663, which meshes with a gear segment 664 fixedly connected by a hub 665 to a bell crank 666, said hub journaled on the shaft 335. A rearwardly-extending arm of the bell crank 666 is pivotally connected by a link 667 to an arm of a Y-shaped lever 668 (Figs. 5 and 7) free on the stud 338. Angularly-disposed arms of the levers 668 carry, respectively, rollers 669 and 670, which cooperate, respectively, with the peripheries of companion plate cams 671 and 672 secured on the main cam shaft 71.

As previously explained, the main cam shaft 71 makes one clockwise revolution each machine operation, and during such revolution the cams 671 and 672 rock the lever 668 first clockwise and then back to normal position. The lever 668, through the bell crank 666 (Fig. 5) and the partial gear 663, rocks the segment 662 first clockwise and then back to normal position in synchronism with the lever 668. Initial movement of the drive segment 662, through the recess 661 in cooperation with the latch 657, carries the plate 659 clockwise in unison therewith, causing said plate, through the stud 653, to shift the slide 647 rearwardly.

As the slide 647 (Fig. 5) moves rearwardly, the lower end of any depressed one of the keys 78 to 84 inclusive, in cooperation with the corresponding stop surface 646 on said slide, terminates such movement of said slide and the plate 659 to position said parts in relation to the depressed control key. Termination of clockwise movement of the plate 659 causes the slot therein, in cooperation with the stud 656, to rock the latch 657 counter-clockwise against the action of the spring 660 to disengage the tooth of said latch from the recess 661 in the operating segment 662 and to simultaneously engage a tooth 673 on said latch with the corresponding one of a series of alining notches 674 in an alining plate 675 supported by the rods 87 and 267.

The segment 662 and connected parts continue their clockwise movement without interruption, and during this movement the periphery of said segment moves opposite the tooth of the latch 657 to secure said latch, the plate 659, and the slide 647 in set positions while the beam mechanism functions, in a manner to be explained presently.

The differential positioning of the plate 659 is transmitted to a corresponding printer-positioning segment 676 free on the shaft 323 (Fig. 5) through the medium of a beam 677. The upper end of the beam 677 is pivotally mounted on a stud 678 carried by the segment 676, and the lower end of said beam has a slot which engages a stud 679 in the plate 659. During counter-clockwise movement of the bell crank 666, a roller 680, carried by an upward arm of said bell crank, in cooperation with an arcuate surface 681 on the beam 677, forces said beam outwardly or toward the left, as viewed in Fig. 5, until an internal arcuate surface thereof contacts a collar on the shaft 323 to position said beam and the printer-positioning segment 676 in accordance with the plate 659 and the depressed control key 78 to 84.

The forward end of a link 682 (Fig. 5) is pivotally mounted on the stud 678, while the rear end of said link is pivotally connected to a gear sector 683 free on a stationary stud 684, said gear sector meshing with a gear 685 secured on the shaft 642, upon which shaft is also secured the drum cam 643 (Figs. 17 and 21) for shifting the auxiliary totalizer. It is therefore obvious that the differential positioning of the segment 676 (Fig. 5) is transmitted to the shaft 642 and the cam 643, to position said cam in accordance with the depressed control keys 78 to 84.

When any one of the plus control keys 78 to 81 inclusive (Figs. 1, 5, and 8) is depressed, the differential mechanism for said keys positions the shafts 642 and the cam 643 so that the upper or plus portion of the cam groove 644, in cooperation with the roller 640, shifts the totalizer framework, comprising the rods 612 and 615 and the arms 634 and 635 (Figs. 17 and 21), toward the right to aline the plus set of wheels 610 of the balance totalizer with the auxiliary actuators 606. When one of the minus keys 82, 83, or 84 is depressed (Fig. 5), the control differential mechanism positions the shaft 642 and the cam 643 so that the minus portion of the cam groove 644, in cooperation with the roller 640, shifts the balance totalizer framework toward the left to aline the minus set of wheels 611 with the auxiliary actuators 606.

The beam mechanism (Fig. 5) including the beam 677 and the associated parts permits the selected set of totalizer wheels to remain in alinement with the auxiliary actuators 606 at the end of machine operation, and in the immediately succeeding operation the balance totalizer may be shifted from its preset position to its new position to aline the selected set of wheels thereon with the actuators.

The printer segment 676 (Fig. 5) meshes with and drives an internal-external gear 686, which bears on the periphery of a corresponding disc 687 supported by the shaft 173. The gear 686 is connected to suitable pinions and one of the square shafts 175 to type wheel driving gears similar to the gear 176 (Fig. 2), said gears in turn meshing with and driving a corresponding type wheel 688 to position said wheel in accordance with the depressed control key 78 to 84 inclusive, so that, upon operation of the impression mechanism, a symbol characteristic of the depressed control key and the operation initiated thereby may be printed upon the record material.

Near the end of machine operation, counterclockwise return movement of the segment 662 (Fig. 5) moves the recess 661 therein opposite the tooth of the latch 657, and, at the same time, a right-hand extension of said segment contacts a shoulder on the stud 679, to return the plate 659 counter-clockwise in unison therewith and to simultaneously disengage the alining tooth 673 on the latch 657 from the corresponding notch 674 and to reengage the driving tooth of said latch with said recess 661.

The beam 677 (Fig. 5) and associated parts constitute a minimum movement mechanism which permits the printer segment 676 and connected parts to remain in set positions at the end of machine operation, which is essential for the proper actuation of the auxiliary totalizer mechanism and for the proper operation of the printer mechanism.

*Auxiliary totalizer engaging and disengaging mechanism*

At the end of adding and subtracting operations, the selected set of wheels of the auxiliary totalizer remain in engagement with the auxiliary actuator racks 606 and are disengaged therefrom at the beginning of the succeeding operation and prior to operation of the control differential mechanism shown in Fig. 5 and explained earlier herein. The mechanism which controls the type of operation to be performed in the auxiliary totalizer—in other words, the mechanism which controls the engaging and disengaging movement of said auxiliary totalizer—is actuated by the control differential mechanism and functions immediately after the selected set of totalizer wheels have been disengaged from the actuators to select and condition the auxiliary totalizer for the desired type of operation.

Figure 20:
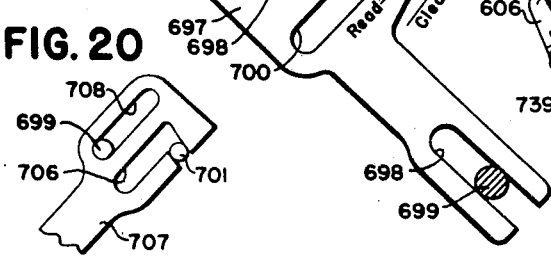
Fig. 20 is a detail view of a portion of the slide for engaging and disengaging the auxiliary totalizer in adding and subtracting operations.

Secured on the shaft 642 (Figs. 5 and 17) and positioned by the control differential mechanism are companion plate cams 690 and 691, the peripheries of which cooperate, respectively, with rollers 692 and 693 carried by a cam lever 694 pivoted on a stationary stud 695. A downward extension of the lever 694 carries a stud 696, which engages a slot in an upward extension of a slide 697 mounted for linear shifting movement by means of two parallel slots 698 therein, in cooperation with stationary studs 699. The slide 697 has a slot 700 engaged by a stud 701 in the forward end of a link 702, the rear end of which link is pivoted on a stud 703 in a crank 704 secured on the engaging shaft 631, to which also are secured the engaging cams 629 and 630. The stud 701 in the shifting link 702 (Fig. 17) cooperates with a shifting notch 706 (Figs. 5 and 20) in an add and substract slide 707, shiftably mounted by means of parallel slots 708 therein, in cooperation with the upper stud 699 and a stationary stud 709. The slide 707 (Fig. 5) carries a stud 710, which engages a slot in the upper end of a lever 711 secured to a hub 712 free on the shaft 314. Also secured on the hub 712 (Fig. 6) is a triangular arm 713 carrying rollers 714 and 715, which cooperate, respectively, with the peripheries of companion plate cams 705 and 716, secured on the main cam shaft 71. One clockwise revolution of the shaft 71 and the cams 705 and 716, through the arms 713 and the lever 711, shifts the slide 707 first forwardly and then back to normal position.

The engaging stud 701 likewise cooperates with an engaging notch 717 (Figs. 4 and 5) in a reset engaging plate 444 and with an engaging slot 718 (Figs. 4 and 5) in a read engaging plate 593.

*Adding and subtracting operations in the auxiliary totalizer*

The engaging and disengaging movement of the auxiliary totalizer is exactly the same in adding and subtracting operations, the only difference being that in adding operations the adding wheels 610 (Fig. 8) are engaged with the auxiliary actuators 606 and in subtracting operations the subtracting wheels 611 are engaged with said actuators.

Assuming that the immediately preceding operation was an adding operation of a subtracting operation, the stud 701 (Figs. 5, 17, and 20) will have been left in engagement with the narrow shifting portion of the notch 706 in the slide 707, as shown here. Consequently initial forward movement of said slide 707 will shift the stud 701 and the link 702 forwardly in unison therewith to rock the crank 704, the shaft 631, and the cams 629 and 630 clockwise (see also Fig. 10). Clockwise movement of the cams 629 and 630, through the slots 628 therein, in cooperation with the rollers 627, rocks the totalizer framework 625 (Fig. 5) also clockwise to disengage the wheels of the auxiliary totalizer from the auxiliary actuators 606.

Figure 17:
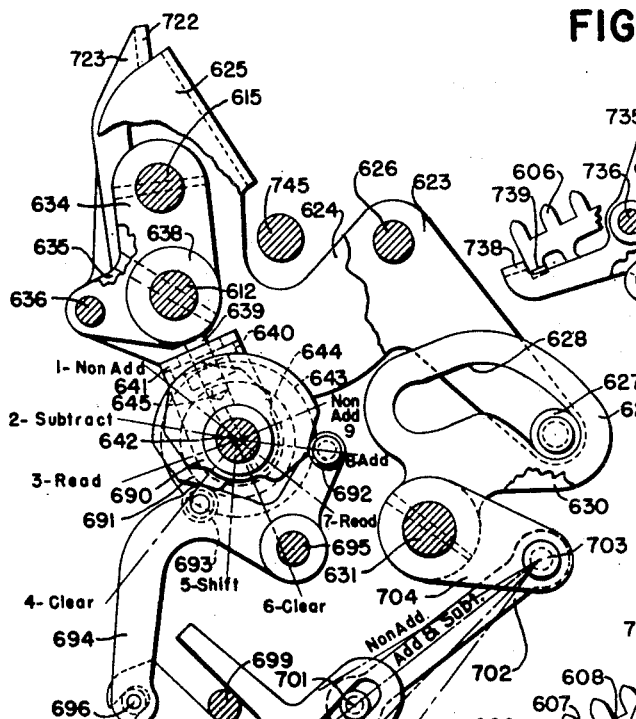
Fig. 17 is a cross-sectional view, showing in particular the engaging mechanism for the auxiliary or balance totalizer.

In adding operations, while the auxiliary totalizer is in disengaged position, the differential mechanism for the control keys (Fig. 5) functions and is positioned by the depressed Add key 79, to in turn position the shaft 642, the shifting cam 643, and the plate cams 690 and 691, as shown in Fig. 17, to retain the stud 701 in engagement with the shifting portion of the notch 706. Positioning of the shifting cam 643 (Figs. 7 and 17) causes the plus side of the shifting groove 644 to aline the plus wheels 610 of the auxiliary totalizer with the actuators 606 in the manner explained previously.

After the amount differential mechanisms have completed their initial movements to position the primary slides 103 and the secondary slides 109 in accordance with the values of the depressed amount keys 73 (Fig. 2), return movement of the slide 707 (Figs. 5 and 6) shifts the stud 701 and the link 702 rearwardly to return the crank 704, the shaft 631, and the cams 629 and 630 counter-clockwise, to cause said cams to return the auxiliary totalizer frame 625 also counter-clockwise to engage the add wheels 610 (Figs. 7, 10, and 12) with the teeth 609 of the actuators 606.

After the adding wheels have thus been engaged with the actuators 606, forward return movement of the primary slides 103 and the actuators 606 (Figs. 2 and 12) revolves the add wheels 610 in an additive direction to enter therein the complement of the value set up on the amount keys 73, as it will be recalled that the primary slides 103 are always positioned to the complement of the true values. This movement of the adding wheels 610 in an additive direction, through the reverse gearing shown in Figs. 10 and 11, drives the corresponding minus wheels 611 in a reverse or subtractive direction to in turn position said subtract wheels to the true value of the amount set up on the amount keys. Inasmuch as the minus wheels 611 contain the true value of the amount, likewise the minus numerals on the indicator wheels 614 (Figs. 1 and 10) display the true value of the amount in the auxiliary totalizer, and the shutter mechanism, explained in a general way earlier herein, will automatically reveal the minus numerals.

At the end of adding and subtracting operations, the selected set of totalizer wheels remain in engagement with the teeth of the actuators 606 and are disengaged therefrom at the beginning of the succeeding operation.

In subtract operations, if the previous operation was an adding operation or a subtracting operation, the stud 701 (Figs. 5, 17, and 20) will be in engagement with the shifting portion of the notch 706, as explained above, and initial movement of the slide 707 will disengage the wheels of the auxiliary totalizer from the actuators 606 in exactly the same manner as explained for adding operations. After the wheels of the auxiliary totalizer have been disengaged from the actuator racks, the control differential mechanism (Fig. 5) functions and is positioned by the depressed Subtract key 84, to in turn position the shaft 642, the shifting cam 643, and the cams 690 and 691 in accordance with said key 84. This positions said cams 643, 690, and 691 in their second positions (Figs. 8 and 17), causing the minus portion of the groove 644 to aline the minus wheels 611 with the actuators 606, and causing the cams 690 and 691 to position the lever 694 and the slide 697 exactly the same as in adding operations to retain the stud 701 in engagement with the shifting portion of the notch 706 (see also Fig. 20) in said slide 707, exactly as in adding operations.

It is, therefore, obvious that in subtracting operations the minus wheels 611 of the auxiliary totalizer are engaged with and disengaged from the auxiliary actuators 606 the same as in adding operations. Consequently, return movement of the primary differential slides 103 (Fig. 2) causes their corresponding auxiliary actuator racks 606 to rotate the minus wheels 611 in an additive direction, whereupon said wheels rotate their corresponding adding wheels 610 in a subtractive direction to subtract from said adding wheels the complement of the value of the depressed amount keys 73.

As long as the auxiliary totalizer remains in a positive condition during subtracting operations, the minus wheels of said totalizer contain the true value of the amount therein, and likewise the minus set of numerals on the corresponding indicator wheels 614 (Fig. 10) indicate the true value in said totalizer and in such cases are displayed for reading purposes through their corresponding apertures in the machine cabinet 70 (Fig. 1). However, when the auxiliary totalizer becomes overdrawn during subtracting operations, the plus wheels 610 then contain the true negative balance; likewise the plus numerals on the corresponding indicator wheels 614 indicate the true negative balance, and the shutter mechanism for the indicator wheels functions automatically to cover the minus set of numerals on the indicator wheels 614 (Figs. 1 and 10) and to simultaneously uncover the plus set of numerals on said wheels for reading purposes.

*Aliner for auxiliary totalizer*

An aliner 722 (Figs. 9, 10, 12, and 17) is provided for alining the wheels 610 and 611 of the auxiliary totalizer when said wheels are disengaged from the actuators 609.

The aliner 722 has a series of alining teeth 721 arranged to engage the teeth of the corresponding gears 613, which, it will be recalled, are integral with the corresponding indicator wheels 614 and mesh with the corresponding add wheels 610. The aliner bar 722 (Figs. 9 and 17) extends between similar right and left arms 723, each of said arms having alined slots which shiftably engage the rods 612 and 615, said arms 723 and said aliner bar 722 being shiftable laterally in unison with said rods to always maintain the teeth 721 in alinement with the corresponding gears 613 (Figs. 10 and 12). Each of the right and left arms 723 has, in its lower end, a similar slot which engages a corresponding stud 724 in a corresponding bell crank 725 pivoted on studs 726 secured, respectively, in the right and left arms 623 and 624 of the totalizer framework 625. The bell cranks 725 carry, on downward extensions thereof, rollers 727, which engage corresponding cam slots 728 in right and left cams 729 secured on the auxiliary totalizer engaging shaft 631 and moving in unison with said shaft and the cams 629 and 630, in accordance with the type of operation being performed, as explained earlier herein.

The contour of the cam slots 728 in the cams 729 in comparison to that of the cam slots 628 in the totalizer-engaging cams 629 and 630 (Figs. 9, 12, and 17) is such that, when said cams are in their counter-clockwise position, as shown here, the alining teeth 721 are disengaged from their corresponding gears 613 immediately after the totalizer wheels 610 or 611 are engaged with their corresponding actuator racks 606. Clockwise movement of the shaft 631 and the cams 629, 630, and 729 causes said cam 729 to shift the aliner bar 722 downwardly to engage its teeth 721 with the corresponding teeth in the gears 613 prior to any disengaging movement imparted to the framework 625 by said cams 629 and 630. After the aliner teeth 721 have been engaged with the corresponding gears 613, prior to disengaging movement of the totalizer framework 625, the cam slots 728, in conjunction with the cam slots 628, cause the aliner 722 to move upwardly in unison with said totalizer framework 625, so that said teeth 721 will remain in engagement with said gears 613 to retain the totalizer wheels 610 and 611 in alinement while they are disengaged from the actuators 606.

In comparing the engaging and disengaging movement of the aliner 722 with the movement of the totalizer frame 625 in adding and subtracting operations, it will be seen that the aliner teeth 721 move into engagement with the teeth of the gears 613 (Fig. 12) prior to disengaging movement of the totalizer frame 625 and remain in engagement with said teeth during disengaging movement of said totalizer framework and during the time that the totalizer framework is in disengaged position. When the totalizer framework 625 is moved to actuator-engaging position to engage the selected set of wheels 610 or 611 with the actuators 606, the aliner 722 moves inwardly in unison therewith until said selected set of totalizer wheels is engaged with said actuators, after which said aliner 722 is moved out of engagement with the gears 613 prior to actuation of said selected set of totalizer wheels.

Transfer mechanism for auxiliary totalizer

The auxiliary totalizer is provided with a transfer mechanism for transferring tens digits in adding and subtracting operations.

The transferring of tens digits is effected in the auxiliary totalizer by movement of the actuator racks 606 (Fig. 12) independently of the corresponding primary slides 103, after said slides have completed their forward return movements, such transferring movement being effected by the springs 742. A latch mechanism restrains the racks 606 against transferring movement until an adjacent lower order wheel passes through zero during return movement of said slides 103, whereupon said latch mechanism is unlatched.

It will be recalled that, at the end of adding and subtracting operations, the selected set of wheels of the auxiliary totalizer remain in engagement with their corresponding actuators 606 and are disengaged therefrom at the beginning of the immediately succeeding operation. The transferring movements of the racks 606 do not take place upon the unlatching of their corresponding latches, but said racks are further restrained against such transferring movement by corresponding retaining pawls which are not released until the primary slides 103 and the corresponding actuators 606 have completed their return forward movements and are resting in home position. After such return movement of the primary slides 103 has been completed and near the end of machine operation, the retaining pawls for the racks 606 are all released, and all of said racks, which have been unlatched, move forwardly under action of the springs 742 to advance the corresponding totalizer wheel one step to effect the transfer of tens digits. The tripped actuator racks 606 remain in their moved positions at the end of machine operation, and in the immediately succeeding operation, just after the wheels of the auxiliary totalizer have been disengaged from said racks and prior to initial movement of the slides 103, the transfer restoring mechanism functions to restore all unlatched racks to latched position.

Figure 18:
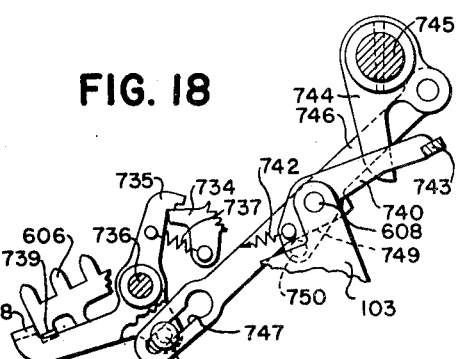
Fig. 18 is a detail view of the transfer mechanism for one denominational order of the auxiliary totalizer and shows said transfer mechanism just after it has been tripped by the adjacent lower order wheel.
Figure 19:
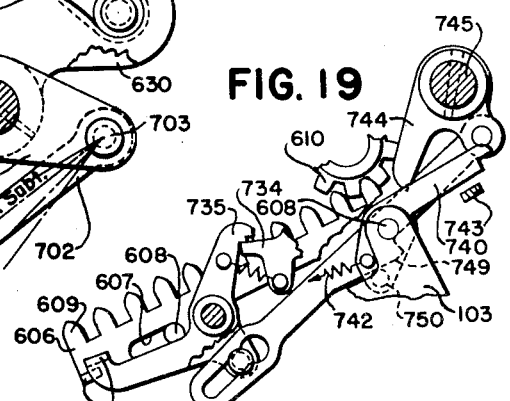
Fig. 19 is a detail view showing the transfer mechanism for one order of the auxiliary totalizer and illustrates in particular the effecting of the transfer by relative movement of the auxiliary rack.

By referring to Figs. 12 to 16 inclusive and Figs. 18 and 19, it will be recalled that each denominational order is provided with a transfer trip pawl 720, a hooked upward extension of which, in cooperation with the long teeth on the corresponding selected set of totalizer wheels, stops said wheels in zero position in reading and resetting operations. The hooked upward extensions of the pawls 720 also act to trip the transfer mechanism when the corresponding ones of the selected set of totalizer wheels pass through zero while rotating in an additive direction.

The transfer trip pawl 720 for each denominational order is secured to a corresponding hub 731 free on a stud 732 secured in a corresponding bracket 733, in turn secured to the corresponding denominational order plate 86 (Fig. 2). Also secured to the tub 731, and in fixed relationship to the pawl 720, is a corresponding finger 734, which cooperates with a corresponding shoulder on a tripping latch 735 for the adjacent higher order, said latch being pivoted on a stud 736 secured to the bracket 733. A forward extension of the latch 735 has a bent-over ear 738, which cooperates with a corresponding ear 739 on the actuator rack 606 for the adjacent higher order totalizer wheel to that which trips the pawl 720.

When the lower order wheel passes through zero, while traveling in an additive direction, its long tooth wipes past the hook-shaped upper end of the pawl 720, rocking said pawl and the corresponding finger 734 counter-clockwise against the action of a spring 737 tensioned between said finger and the transfer latch 735. Counter-clockwise movement of the finger 734 disengages it from the shoulder on the latch 735 to release said latch to the action of the spring 737, which immediately rocks said latch clockwise to the position shown in Fig. 18, which position is determined by the finger 734 contacting the surface adjacent to the shoulder on the upward extension of said latch. This clockwise tripping movement of the latch 735 moves the ear 738 upwardly out of the path of the corresponding ear 739 on the actuator 606 for the adjacent higher order to free said actuator for forward transfer movement.

The above-described tripping of the transfer latch 735 takes place during forward or return movement of the primary slides 103 and the corresponding actuators 606, and the tripped transfer latch 735 remains in tripped position, as shown in Fig. 18, until after the beginning of the succeeding operation, as will be explained presently.

The release of the latch 735 (Figs. 12, 13, 18, and 19) does not permit forward transfer movement of the corresponding actuator rack 606, upon arrival of said rack in home position, as said rack is further restrained against such movement by a retaining pawl 740 free on the rear one of the studs 608 in the corresponding primary slide 103, said pawl being urged clockwise by the spring 742 into engagement with an ear 743 on the forward end of the corresponding actuator rack 606, to normally restrain said rack 606 against forward transferring movement.

After the primary slide 103 and the corresponding actuator rack 606 have completed their return movement, as shown in Fig. 18, a restoring finger 744 secured on a shaft 745 journaled in the machine framework is rocked clockwise in unison with said shaft for the purpose of releasing the retaining pawl 740. The restoring finger 744 for the denomination shown in Fig. 18 has pivotally connected thereto the upper end of a pitman 746 with a slot 747 in its lower end, which engages a stud 748 in a downward extension of the transfer latch 735 for the adjacent higher order.

Clockwise movement of the finger 744 from the position shown in Fig. 18 to the position shown in Fig. 19 shifts the pitman 746 in unison therewith, causing a camming surface 749 thereon, in cooperation with a stud 750 in the retaining pawl 740, to rock said pawl counter-clockwise against the action of the spring 742, to disengage the shoulder on the rear end of said pawl from the ear 743 to release the actuator rack 606 for forward transferring movement. Forward transferring movement of the actuator rack 606 (Figs. 18 and 19), under influence of the spring 742, which movement is determined by the studs 608 in cooperation with the slots 607, causes the teeth 609 therein, in cooperation with the teeth of the corresponding totalizer wheel 610 or 611, to advance said wheel the equivalent of one tooth space to transfer a tens digit from the adjacent lower order thereto.

The parts of the transfer mechanism remain in the position shown in Fig. 19 until the immediately succeeding machine operation, in the beginning of which they are restored to untripped or normal positions, as will be explained presently.

When there is no transferring of tens digits from a lower order to an adjacent higher order, the transfer latch 735 for the higher order is not tripped and therefore remains effective, as shown in Fig. 12, and the ear 738 on said latch remains in the path of the ear 739 on the corresponding actuator 606 to obstruct forward transferring movement of said actuator after the corresponding retaining pawl 740 is disengaged by the corresponding pitman 746, as explained in connection with Figs. 18 and 19.

The shaft 745 (Fig. 9) is rocked, as explained above, through the medium of a crank 752 secured thereon, said crank being pivotally connected by a link 753 to a lever 754 free on the shaft 314. The lever 754 carries rollers 755 and 756, which cooperate, respectively, with the peripheries of companion plate cams 757 and 758 secured to the main cam shaft 71.

In the beginning of an operation which immediately follows an adding operation or a subtracting operation, the wheels of the auxiliary totalizer are disengaged from their corresponding actuators 606, and, immediately after such disengagement, the cams 757 and 758 (Fig. 9), through the lever 754 and the link 753, rock the crank 752, the shaft 745, and the fingers 744 counter-clockwise from home position, as shown here, to fully-restored position, as shown in Fig. 16. This counter-clockwise movement of the fingers 744 withdraws the surfaces 749 of the pitmans 746 from the corresponding studs 750 to release the corresponding retaining pawls 749 to the action of their springs 742, and simultaneously the lower ends of said fingers 744 engage the ears 743 on the corresponding actuator racks 606 to restore said racks forwardly from tripped position, as shown in Fig. 19, to untripped position, as shown in Fig. 16. This restoration of the actuators 606 moves the ears 743 slightly beyond the shoulders on the retaining pawls 740 to insure that said shoulders will move into the path of said ears. Simultaneously with the restoration of the actuators 606, the slot 747 (Fig. 16) in the pitman 746 for the adjacent lower order, in cooperation with the stud 748 in the transfer latch 735, restores said latch counter-clockwise against the action of the spring 737, from tripped position, as shown in Fig. 19, to the position shown in Fig. 16, in which the ear 738 on said latch moves into the path of the corresponding ear 739 on the actuator 606 to obstruct forward transfer movement of said actuator 606.

The restoration of the latches 735 takes place after the corresponding actuators 606 have been restored forwardly; consequently the ears 739 on said actuators are out of the path of the ears 738 on said latches at the time of such restoration. The counter-clockwise restoration of the latches 735 to the position shown in Fig. 16 moves the shoulders on their upper ends beyond the fingers 734, thus permitting the springs 737 to restore the pawls 720 and to move said fingers 734 into the paths of said shoulders to retain said latches in untripped position, as shown here.

After full movement of the shaft 745 and the fingers 744 counter-clockwise has restored the transfer mechanism, as explained above, said shaft, said fingers, and the pitmans 746 are restored part-way clockwise to the position shown in Figs. 13 and 18. The shaft 745, the fingers 744, and the pitmans 746 remain in this partially-restored position, in which they do not interfere with the tripping of the transfer mechanisms, until near the end of machine operation and until after the primary slides 103 and the secondary slides 109 have completed their forward return movements, after which the cams 757 and 758 complete the clockwise return movement of said fingers 744 and pitmans 746 to release the pawls 740, in the manner explained previously, to permit transfer movement forwardly of all tripped actuator racks 606.

*Fugitive 1 mechanism*

It will be recalled that the balance or auxiliary totalizer with which the present machine is equipped is arranged for computing complementary values, and for this reason it was necessary to set the plus wheels at 9 and the minus wheels at zero, which is the reverse of the usual practice in totalizers of this type, in which the plus and minus wheels of each denominational order are geared together for reverse movement. In this arrangement of the totalizer wheels, the entering of complementary values in the plus side of said totalizer, in adding operations, causes the corresponding minus wheels to be set to the true values of said complementary values, and consequently, in order to obtain a recording and indication of the true values, it is necessary, as long as the auxiliary totalizer is in a positive condition, to read and reset the minus wheels.

In subtract operations, the complementary values are added in the minus side of the balance totalizer, and, as long as said totalizer is not overdrawn, the minus wheels are set to the true values and consequently are read and reset in order to obtain a recording of said true values. If, during subtract operations, the auxiliary totalizer changes from a plus condition to a minus condition—that is, becomes overdrawn—the plus wheels will contain the true negative balance and are read and reset to obtain a recording of said true negative balance.

The indicator wheels 614 (Figs. 1, 10, 11, and 12) for each denominational order are geared to and driven by the corresponding plus and minus wheels. It will be recalled that the indicator wheels 614 have thereon two sets of numerals, one of which corresponds to the minus wheels of the same order, and the other set of which corresponds to the plus wheels of the same order. The shutter mechanism, which alternately reveals one set of numerals on the indicator wheels 614 and conceals the other set of numerals, functions automatically, and, when the auxiliary totalizer is in a positive condition, the minus set of numerals is exposed for reading purposes, and, when the auxiliary totalizer is in an overdrawn condition, the plus set of numerals is exposed for reading purposes. The plus and minus sets of numerals on the indicator wheels 614 may, if desired, be of different colors, so that the operator may readily distinguish a plus balance from a negative balance or overdraft.

It is a well-known fact that in conventional totalizers, in which the plus and minus wheels of each denominational order are geared together for reverse movement and in which the plus wheels are set to zero and the minus wheels set at 9, when the totalizer changes from a positive condition to a negative condition, it is necessary to enter a "fugitive 1" into the lowest order minus wheel in order to offset the correction of an erroneous condition, which is a characteristic of this type of totalizer. Likewise, when totalizers of this type change from a negative condition to a positive condition, it is necessary to enter a "fugitive 1" into the lowest order plus wheel to again correct the amount in said totalizer.

In the auxiliary totalizer of the present machine, which, as previously explained, deals in complementary values, and in which the plus wheels are set at 9 and the minus wheels at zero, it is necessary to enter a "fugitive 1" in the lowest order every time the highest order wheel passes through zero, regardless of whether the auxiliary totalizer is in a positive condition or in an overdrawn or negative condition, and regardless of whether the type of operation being performed is an adding operation or a subtracting operation. In other words, in adding operations in the auxiliary totalizer, every time the highest order adding wheel passes through zero, it is necessary to enter a "fugitive 1" in the lowest order adding wheel in order to correct the totalizer, and in subtracting operations, every time the highest order subtract wheel passes through zero, it is also necessary to enter a "fugitive 1" into the lowest order subtract wheel in order to correct the auxiliary totalizer; and the changing of the auxiliary totalizer from a positive condition to a negative condition or vice versa does not alter or in any way change the above-described sequence of the entering of the "fugitive 1."

The long teeth on the highest order plus and minus wheels 610 and 611 (Fig. 14) cooperate with a hook-shaped tripping extension on a fugitive 1 trip pawl 760 free on a stud 761 secured in the highest order partition plate 86. A link 762 pivotally connects the pawl 760 to a crank 763 secured on the left-hand end of a shaft 764 journaled in the partition plates 86. Secured on the right-hand end of the shaft 764 (Figs. 14 and 15) is a fugitive 1 trip arm 766 having a shoulder 767, which engages an upward extension of a latch 768 free on a stud 769 in a bracket (not shown) similar to the bracket 733 (Fig. 13) for the lowest order denomination. A spring 765 (Fig. 14) urges the shaft 764 and the trip pawl 760 clockwise to normally maintain the tripping extension on said pawl in the path of the long tooth of the highest order adding or subtracting wheel 610 or 611, whichever is effective, and to maintain the shoulder 767 in yielding engagement with the upward extension of the latch 768, as shown in Fig. 15.

When the latch 768 is retained in untripped position by the arm 766, as shown in Fig. 15, a bent-over ear 770 on a forward extension of said latch is retained in the path of a similar ear 771 on the actuator rack 606 for the lowest order denomination to restrain said rack against forward transfer movement in exactly the same manner as explained in connection with the transfer mechanisms shown in Figs. 12 and 13.

In adding operations, the long tooth on the highest order plus wheel 610 is alined with the fugitive 1 trip pawl 760, and in subtracting operations the long tooth on the highest order minus wheel 611 is alined with said tripping pawl. Consequently, when either one of said wheels passes through zero while traveling in a clockwise or additive direction, the long tooth thereon wipes past the tripping extension on the pawl 760 and rocks said pawl and, through the link 762, the crank 763, the shaft 764, and the arm 766 (Figs. 14 and 15) a slight distance counter-clockwise against the action of the spring 765. This slight counter-clockwise movement of the arm 766 withdraws the shoulder 767 thereon from the upward extension of the latch 768 and releases said latch to the action of a spring 772, which immediately rocks said latch clockwise a slight distance until its upward extension contacts a stop shoulder 773 on the rear end of the arm 766. This clockwise movement of the latch 768 moves the ear 770 upwardly out of the path of the ear 771 on the actuator rack 606 for the lowest order, to free said rack for transfer movement upon subsequent release of its retaining pawl.

Even though the ear 770 is moved out of the path of the ear 771, the rack 606 (Fig. 15) is further restrained against transfer movement by a restraining pawl 774 free on the rear stud 608 in the primary slide 103 for the lowest order. The pawl 774 is urged clockwise by a spring 775 to normally maintain a shoulder on a rear extension thereof in the path of an ear 776 on the rear end of the rack 606, to obstruct transfer forward movement of said rack 606 until said retaining pawl 774 is rocked to ineffective position near the end of machine operation. Near the end of machine operation, return movement of the shaft 745 and the finger 744 clockwise from the position shown in Fig. 13 to home position (Fig. 15) causes the camming surface 749 on the pitman 746 for the lowest order, in cooperation with a stud 777 in the retaining pawl 774, to rock said pawl counter-clockwise against the action of the spring 775 out of engagement with the ear 776. This releases the lowest order actuator rack 606 for forward transfer movement to enter the fugitive 1 in the lowest order plus or minus wheel 610 or 611, whichever is selected for actuation.

At the beginning of the next operation, after the set of wheels (plus or minus) selected in the previous operation has been disengaged from the actuators 606, counter-clockwise restoring movement is imparted to the shaft 745 and the restoring fingers 744, causing said restoring finger for the lowest order (Fig. 15) to engage the ear 776 and restore the lowest order actuator rack 606 rearwardly and to simultaneously withdraw the surface 749 from the stud 777 so that the retaining pawl 774 may be carried by the spring 775 into the path of said ear 776 to retain said lowest order rack 606 in restored or untripped position. Simultaneously a pitman 778, similar to and operating in unison with the pitmans 746, through a slot 779 in its forward extension, in cooperation with a stud 780 in a downward extension of the latch 768, restores said latch counter-clockwise against the action of the spring 772 to move the ear 770 into the path of the ear 771 and to simultaneously move the upward extension of said latch out of engagement with the shoulder 773 and beyond the shoulder 767, whereupon the spring 765 (Figs. 14 and 15) restores the arm 766, the shaft 764, and the fugitive 1 trip pawl 760 clockwise to untripped positions, as shown here.

The retaining pawls 740 (Fig. 12) for the different denominational orders of the machine and the retaining pawl 774 (Fig. 15) for the lowest order denomination are always rocked to ineffective positions near the end of each machine operation. However, the transfer latches 735 for all denominational orders, except the lowest order, and the fugitive 1 latch 768 for the lowest order obstruct transfer movement of their corresponding actuator racks 606 unless such latches have previously been tripped in the manner explained above.

It is believed that five different examples of computations in the auxiliary totalizer may be helpful in imparting a better understanding of the functioning of this totalizer.

*Example 1.*—For simplicity let it be assumed that the auxiliary totalizer has three denominational orders instead of the ten denominational orders provided in the machine used to illustrate the present invention. Considering that the auxiliary totalizer is in a normal or zeroized condition—that is, the plus side at 9 and the minus side at zero—it is desired to add "234" into said totalizer. In adding operations, the plus wheels are engaged with the auxiliary actuators, and, inasmuch as said actuators are positioned by their corresponding primary differential slides to the complement of the true value, the complement of 234 (765) is added into the plus side of the auxiliary totalizer. The addition of the complementary value 765 to the plus side produces the sum 764, and, as the highest order wheel passes through zero, a fugitive 1 is entered in the lowest order, resulting in the final figure 765 on the plus side of the auxiliary totalizer and the true figure 234 on the minus side of said totalizer. In this case, as the minus side of the auxiliary totalizer contains the true value, this side will be read and/or reset, and likewise the minus numerals on the indicator wheels 614 (Fig. 10) will be exposed for reading purposes.

*Example 2.*—In Example 2, the plus and minus sides of the auxiliary totalizer are as they were left in Example 1—that is, standing at 765 and 234, respectively—and in this case it is desired to add 432 in said totalizer. The complement of 432 (567) is added in the plus side of the auxiliary totalizer, thus giving the sum of 332, and, inasmuch as the highest order wheel again goes through zero, a fugitive 1 is entered in the lowest order, making a final figure of 333 on the plus side and a final figure of 666 on the minus side, which in this case is the true value of the amount in the auxiliary totalizer.

*Example 3.*—In Example 3, the plus and minus wheels of the auxiliary totalizer are in the positions in which they were left at the end of Example 2—that is, at 333 and 666, respectively—and in this case it is desired to subtract 567 from said totalizer.

In subtract operations, the minus side of the auxiliary totalizer is engaged with the actuator racks, and, inasmuch as said racks are positioned to the complement of the true value, the complement of 567 (432) is entered additively into the minus side of the auxiliary totalizer, giving the sum of 098, and, as the highest order minus wheel has passed through zero, a fugitive 1 was entered in the lowest order, giving a final figure of 099 on the minus side of the auxiliary totalizer and 900 on the plus side.

In connection with Example 3, it will be seen that, as long as the balance totalizer remains in a positive condition—that is, not overdrawn— the minus wheels of said totalizer contain the true value, the same as in adding operations.

*Example 4.*—In Example 4, the plus and minus wheels of the auxiliary totalizer are in the positions in which they were left at the end of Example 3—that is, at 900 and 099, respectively— and in this example it is desired to subtract 765 from said totalizer.

As in the previous example, the complement of 765 (234) is added to the minus side of the auxiliary totalizer, giving the sum of 333 on said minus side, and in this case the highest order wheel does not pass through zero; consequently there is no entering of a fugitive 1 in the lowest order, and, as a result, the minus wheels remain at 333 and the corresponding plus wheels at 666.

It will be seen that in Example 4 the auxiliary totalizer changed from a positive condition to a negative condition and that regardless of this fact, if the highest order wheel of the minus side of said totalizer does not pass through zero, there is no entering of the fugitive 1, as in the case of conventional totalizers. It will likewise be seen that, when the auxiliary totalizer changes from a positive condition to a negative condition, the plus side of said totalizer contains the true negative balance, and in this case said wheels are read and reset in order to obtain a recording of said true negative balance. Likewise, when the auxiliary totalizer is overdrawn, the plus numerals on the indicator wheels 614 (Fig. 10) display the true negative balance and are exposed for reading purposes in such operations.

*Example 5.*—In Example 5, the plus and minus wheels of the auxiliary totalizer are in the positions in which they were left at the end of Example 4—that is, at 666 and 333, respectively— and in this case it is desired to subtract 123 therefrom. Adding the complement of 123 (876) to the minus side of the auxiliary totalizer gives the sum of 209, and, inasmuch as the highest order minus wheel passed through zero, a fugitive 1 is automatically entered in the lowest order to make a final figure of 210 in the minus side of the auxiliary totalizer and 789 in the plus side. Inasmuch as the auxiliary totalizer is still in an overdrawn condition, the plus wheels contain the true negative balance (789), and said plus wheels are therefore selected for reading and resetting, in case it is desired to obtain a recording of the true negative balance.

It should be remembered that amounts may be transferred from the auxiliary totalizer to any of the totalizers on the three transaction totalizer lines, and likewise, amounts may be transferred from any of the totalizers on the three transaction totalizer lines to the auxiliary totalizer.

As explained above, in overdraft operations the plus side of the auxiliary totalizer is read and reset in order to obtain a recording of the true negative balance. In resetting the plus side of the auxiliary totalizer, its wheels are left standing at zero, while the corresponding minus wheels are left standing at 9, which is the reverse of the normal result. However, this erroneous condition is corrected in the immediately following operation, whether it be an adding operation or a subtracting operation, by the entering of a plus or a negative amount into the auxiliary totalizer.

It is believed that a general understanding of the operation of the machine chosen to illustrate the present invention and a thorough understanding of the operation of the tens transfer mechanism for the balance totalizer will have been obtained from a careful perusal of the preceding specification, and therefore no further description of operation of the machine is believed necessary.

While the form of mechanism shown and described herein is admirably adapted to fulfill the objects primarily stated, it is to be understood that it is not intended to confine the invention to the one form or embodiment disclosed herein, for it is susceptible of embodiment in various other forms all coming within the spirit and scope of the invention.

What is claimed is:

1. In a machine of the character described, capable of item-entering operations, the combination of a totalizer having a plurality of denominational order wheels; a differential actuator for one order of the totalizer; a part movably mounted on the actuator and coacting with the corresponding totalizer wheel to enter items therein; means to urge the part in a certain direction; means to retain the part against movement in said certain direction; means to release the retaining means near the end of machine operations; a second means to retain the part; and means operable when the adjacent lower order wheel passes through zero to release the second retaining means to effect a transfer of tens digits.

2. In a machine of the character described, capable of item-entering operations, the combination of a totalizer to receive the items, said totalizer comprising a plurality of denominational order wheels; a differential actuator for each denominational order of the totalizer; a part coacting with the corresponding totalizer wheel for entering items in said wheel, said part mounted on the actuator for movement in unison therewith but also movable in relation thereto; yieldable means to move the part in relation to the actuator; means to retain the part against relative movement; a second means mounted on the actuator to retain the part against relative movement; means operable by the adjacent lower order wheel, when it passes through zero, to release the first retaining means; and means to release the second retaining means near the end of machine operation to effect a tens transfer.

3. In a machine of the class described, capable of item-entering operations, the combination of a totalizer having a plurality of denominational order elements; means to set up items to be entered in the totalizer; a differential actuator for each order of the totalizer, said actuators positioned by the corresponding item setting means; a member carried by each actuator and cooperating with the corresponding element of the totalizer to enter items therein, said members normally positioned in unison with the corresponding actuators but also movable independently thereof; yieldable means to move the members independently of the actuators; a first means on the actuators to hold the corresponding members against movement by the yieldable means; a second means to hold the corresponding members against movement by the yieldable means; means operable when a lower order element of the totalizer passes through zero to release the second retaining means of the adjacent higher order; and means effective near the end of machine operation to release the first retaining means to effect a tens transfer.

4. In a machine of the class described, arranged to perform item-entering operations, the combination of a totalizer comprising a series of denominational elements; a series of denominational rows of keys for setting up items to be entered in the totalizer; denominational actuators coacting with the corresponding keys and positioned thereby; a part carried by each actuator and coacting with the corresponding totalizer elements to enter items therein corresponding to the effective keys, said parts mounted on the corresponding actuators for movement relative thereto for the purpose of transferring tens digits; yieldable means to urge the parts in transferring direction; a first means on each of the actuators to retain the corresponding parts against movement by the yieldable means; a second means to retain the corresponding parts against movement by the yieldable means; means effective when the adjacent lower order totalizer element moves to zero to render the second retaining means for the part of the adjacent higher order ineffective; and means effective after the second retaining means has been rendered ineffective to render the first retaining means ineffective to transfer tens digits from one order to the next.

5. In a machine of the class described, arranged to perform item-entering operations, the combination of a totalizer comprising a series of denominational elements; a series of denominational rows of keys to set up values to be entered in the totalizer; denominational actuators coacting with the corresponding keys and positioned thereby to the value of said keys; a part mounted on each actuator and positioned in unison therewith, said parts coacting with the corresponding totalizer elements to enter the values set up on the keys in said totalizer elements, said parts mounted to move independently of their respective actuators for the purpose of transferring tens digits; yieldable means to urge the parts in transferring direction; means to restore the parts against the action of the yieldable means; a first means mounted on the respective actuators to retain the corresponding parts in restored positions; a second means to retain the parts in restored position; means effective when a totalizer element moves to zero position to render the second retaining means for the part for the adjacent higher order ineffective; and means operable after the second retaining means has been rendered ineffective to render the first retaining means ineffective to release the part for the adjacent higher order for movement by the yieldable means to effect the transfer of a tens digit.

MAXIMILIAN M. GOLDBERG.

REFERENCES CITED

The following references are of record in the file of this patent:

FOREIGN PATENTS

| Number | Country | Date |
| --- | --- | --- |
| 614,955 | Germany | June 12, 1935 |